US011247282B2

(12) United States Patent
Takahashi

(10) Patent No.: US 11,247,282 B2
(45) Date of Patent: Feb. 15, 2022

(54) ELECTRIC DISCHARGE MACHINING APPARATUS

(71) Applicant: Sodick Co., Ltd., Kanagawa (JP)

(72) Inventor: Jun Takahashi, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 390 days.

(21) Appl. No.: 16/446,814

(22) Filed: Jun. 20, 2019

(65) Prior Publication Data
US 2019/0388989 A1    Dec. 26, 2019

(30) Foreign Application Priority Data
Jun. 22, 2018   (CN) .......................... 201810647822.7

(51) Int. Cl.
| | |
|---|---|
| *B23H 1/10* | (2006.01) |
| *B23H 1/02* | (2006.01) |
| *B23H 7/26* | (2006.01) |
| *B23H 7/36* | (2006.01) |
| *B23H 9/14* | (2006.01) |
| *B23H 1/08* | (2006.01) |

(52) U.S. Cl.
CPC ............... *B23H 1/028* (2013.01); *B23H 1/10* (2013.01); *B23H 7/265* (2013.01); *B23H 7/36* (2013.01); *B23H 9/14* (2013.01); *B23H 1/08* (2013.01)

(58) Field of Classification Search
CPC . B23H 1/10; B23H 7/265; B23H 7/36; B23H 9/14; B01F 2005/0014
See application file for complete search history.

(56) References Cited

U.S. PATENT DOCUMENTS

| | | | |
|---|---|---|---|
| 4,578,556 | A | 3/1986 | Inoue |
| 5,281,788 | A | 1/1994 | Abiko et al. |
| 6,344,624 | B1 | 2/2002 | Moro et al. |
| 7,093,384 | B2 * | 8/2006 | Wong ...................... D06F 75/10 |
| | | | 38/77.5 |

(Continued)

FOREIGN PATENT DOCUMENTS

| | | |
|---|---|---|
| CN | 1282285 A | 1/2001 |
| CN | 1471447 A | 1/2004 |

(Continued)

OTHER PUBLICATIONS

Machine translation of Japan Patent document No. 2013-173,199A (Year: 2021).*

(Continued)

*Primary Examiner* — Geoffrey S Evans
(74) *Attorney, Agent, or Firm* — Maier & Maier, PLLC

(57) ABSTRACT

An electric discharge machining apparatus includes a tool electrode that performs electric discharge machining to a workpiece, a housing in which the tool electrode is inserted, a compressed gas supplying device for supplying compressed gas into a mist generating region which is provided between an inner wall of the housing and the tool electrode, a first flow path through which the compressed gas flows and connecting the compressed gas supplying device with the mist generating region, a pressurized working fluid supplying device for supplying pressurized working fluid into the mist generating region, and a second flow path through which the pressurized working fluid flows and connecting the pressurized working fluid supplying device with the mist generating region.

7 Claims, 2 Drawing Sheets

(56) References Cited

U.S. PATENT DOCUMENTS

| | | | |
|---|---|---|---|
| 2004/0026379 A1 | | 2/2004 | Kimura et al. |
| 2005/0077269 A1 | * | 4/2005 | Yokomichi .............. B23H 9/14 219/69.2 |
| 2014/0144884 A1 | * | 5/2014 | Suzuki ..................... B23H 1/10 219/69.11 |
| 2016/0361454 A1 | * | 12/2016 | Minamio ................ A61L 9/145 |
| 2018/0126473 A1 | | 5/2018 | Yamane |

FOREIGN PATENT DOCUMENTS

| | | | |
|---|---|---|---|
| CN | 106695031 A | | 5/2017 |
| CN | 106825798 A | | 6/2017 |
| CN | 108057934 A | | 5/2018 |
| EP | 0515975 A2 | | 12/1992 |
| JP | H05-169322 A | | 7/1993 |
| JP | 2006-102828 A | | 4/2006 |
| JP | 2013-173199 A | | 9/2013 |
| JP | 2013173199 A | * | 9/2013 |
| WO | 2013/031011 A1 | | 3/2013 |

OTHER PUBLICATIONS

Office Action dated Jul. 16, 2019, in corresponding Japanese Application No. 2018-133339; 10 pages.
Japanese Office Action dated Mar. 5, 2019 of corresponding Japanese application No. 2018-133339; 10 pages.
Office Action dated Sep. 20, 2019, in corresponding Chinese Application No. 201810647822.7; 14 pages.
Wataru Natsu et al., "Realization of High-speed Micro EDM for high-aspect-ratio micro hole with mist nozzle", 2016 JSPE Autumn Conference, Sep. 6, 2016, pp. 167-168, including partial Englsih-language translation.
Ryota Nakamura et al.,"Investigation of effect of machining liquid supply method and verification of effect of mist nozzle in micro deep hole electric discharge machining", The 24th Society of Precision Engineering Student Member Graduation Research Presentation Lecture Proceedings, Mar. 6, 2017, pp. 117-118, including partial English-language translation.
Wataru Natsu et al., "Realization of high-speed micro EDM for high-aspect-ratio micro hole with mist nozzle", 19th CIRP Conference on Electro Physical and Chemical Machining, Apr. 23-27, 2018, pp. 575-577.

* cited by examiner

ELECTRIC DISCHARGE MACHINING APPARATUS

CROSS-REFERENCE TO RELATED APPLICATION

This application claims priority to Chinese Patent Application, CN201810647822.7 filed on Jun. 22, 2018, the entire contents of which are incorporated by reference herein.

TECHNICAL FIELD

The present invention relates to an electric discharge machining apparatus for machining a workpiece by moving a tool electrode with an electric discharge generated between the workpiece and the tool electrode, and in particular to an electric discharge machining apparatus which performs machining with mist sprayed to a machining portion of the workpiece in the air.

BACKGROUND ART

The electric discharge machining apparatus arranges the tool electrode and the workpiece with a predetermined gap, applies voltage between the tool electrode and the workpiece, and generates discharge. And the tool electrode and the workpiece are moved relative to each other so as to machine the workpiece into a desired shape.

Patent Literature 1 discloses aerial electric discharge machining apparatus that performs electric discharge machining in the air. In this aerial discharge machining apparatus, compressed air is ejected from a small hole tool electrode and flows along the side surface of the small hole tool electrode. And by arranging two liquid mist ejecting nozzles on both sides of the small hole tool electrode and at positions away from the machining portion, and by ejecting the mist from the liquid mist ejecting nozzle, the workpiece is machined with shavings which is generated during electric discharge machining removed.

CITATION LIST

Patent Literature

Patent Literature 1: JP2006-102828A

SUMMARY OF INVENTION

Technical Problem

However, in general, the diameter of the small hole tool electrode is very small, and the amount of compressed air ejected from the small hole tool electrode and flowing along the side surface of the small hole tool electrode described in Patent Literature 1 is also very small. In addition to that, by gas, it is difficult to remove shavings as compared to liquid and the like. Furthermore, in the aerial electric discharge machining apparatus described in Patent Literature 1, since mist is ejected from two liquid mist ejecting nozzle arranged on both sides of the small hole tool electrode and at positions away from the machining portion, the mist don't reach the machining portion and the shavings cannot be sufficiently removed when the deep portion of the workpiece is machined.

The present invention has been made in consideration of the afore-mentioned circumstances. An object of the present invention is to provide an electric discharge machining apparatus capable of sufficiently removing shavings in aerial electric discharge machining.

Solution to Problem

The electric discharge machining apparatus of the first aspect of the present invention comprises a tool electrode that performs electric discharge machining to a workpiece, a housing in which the tool electrode is inserted, a compressed gas supplying device for supplying compressed gas into a mist generating region which is provided between an inner wall of the housing and the tool electrode, a first flow path through which the compressed gas flows and connecting the compressed gas supplying device with the mist generating region, a pressurized working fluid supplying device for supplying pressurized working fluid into the mist generating region, and a second flow path through which the pressurized working fluid flows and connecting the pressurized working fluid supplying device with the mist generating region, wherein a pressurized working fluid supplying opening, which is a boundary between the second flow path and the mist generating region, is disposed at two or more positions with equal angular interval in a circumferential direction of the inner wall of the housing, or formed on an entire circumference of the inner wall of the housing, and the pressurized working fluid supplied into the mist generating region is mixed with the compressed gas in the mist generating region so that the pressurized working fluid is atomized to be ejected as mist.

In the present invention, the pressurized working fluid suppling openings, which is a boundary between the second flow path and the mist generating region, is disposed at two or more positions with equal angular interval in a circumferential direction of the inner wall of the housing, or formed on an entire circumference of the inner wall of the housing. Therefore, in the circumferential direction of the inner wall of the housing, the pressurized working fluid can be supplied to the mist generating region without deviation. As a result, since the mist can be uniformly generated in the mist generating space and can be ejected without deviation along the tool electrode, shavings in the vicinity of the tool electrode where the electric discharge machining is performed are reliably removed.

According to the second aspect of the present invention, the electric discharge machining apparatus according to the first aspect further comprises a fluid tank through which the tool electrode is inserted and the fluid tank being disposed above the mist generating region, and a third flow path through which the pressurized working fluid flows from the pressurized working fluid supplying device into the fluid tank, the third flow path connecting the fluid tank with the pressurized working fluid supplying device.

In the present invention, the electric discharge machining apparatus further comprises a fluid tank through which the tool electrode is inserted and disposed above the mist generating region, and the third flow path through which the pressurized working fluid flows from the pressurized working fluid supplying device into the fluid tank, connects the fluid tank with the pressurized working fluid supplying device. Therefore, the tool electrode can be cooled by the working fluid in the fluid tank. As a result, the temperature increase of the tool electrode during electric discharge machining can be suppressed, and consumption of the tool electrode can be suppressed.

According to the third aspect of the present invention, in the electric discharge machining apparatus according to the first aspect, the mist generating region includes a mist generating space provided on the lower side of the housing, and a compressed gas supplying space provided between the mist generating space and the fluid tank so as to cover the entire upper side of the mist generating space, the pressurized working fluid is supplied into the mist generating space from the pressurized working fluid supplying device through the second flow path, and the compressed gas is supplied into the compressed gas supplying space from the compressed gas supplying device through the first flow path.

In the present invention, the mist generating region includes a mist generating space provided on the lower side of the housing, and a compressed gas supplying space provided between the mist generating space and the fluid tank so as to cover the entire upper side of the mist generating space, the pressurized working fluid is supplied into the mist generating space from the pressurized working fluid supplying device through the second flow path, and the compressed gas is supplied into the compressed gas supplying space from the compressed gas supplying device through the first flow path. Therefore, compressed gas can flow to the mist generating space through the compressed gas supplying space. As a result, since the compressed gas can be supplied to the mist generating space without deviation, the flow of the compressed gas can be further stabilized.

According to the fourth aspect of the present invention, the electric discharge machining apparatus according to the second aspect further comprises a plurality of dies supporting the tool electrode, wherein a first die of the dies is disposed at the lower end of the fluid tank, and a gap is provided between the tool electrode and the first die.

In the present invention, the electric discharge machining apparatus further comprises a plurality of dies supporting the tool electrode, wherein the first die of the dies is disposed at the lower end of the fluid tank, and gap is provided between the tool electrode and the first die. Therefore, it is possible to prevent deflection of the tool electrode generated during the electric discharge machining. As a result, the shift of a machining position can be prevented, and machining can be performed with high precision. Further, the pressurized working fluid in the fluid tank can be ejected from the first gap between the tool electrode and the first die by the Venturi effect. As a result, the pressurized working fluid in the fluid tank can be used for mist generation. Moreover, the tool electrode under the fluid tank can be cooled by the pressurized working fluid.

According to the fifth aspect of the present invention, the electric discharge machining apparatus according to the fourth aspect further comprises a plurality of dies supporting the tool electrode, wherein a second die of the dies is disposed at the upper end of the fluid tank, and a gap is provided between the tool electrode and the second die.

In the present invention, the electric discharge machining apparatus further comprises a plurality of dies supporting the tool electrode, wherein a second die of the dies is disposed at the upper end of the fluid tank, and the gap is provided between the tool electrode and the second die. Therefore, it is possible to prevent deflection of the tool electrode generated during the electric discharge machining. As a result, the shift of a machining position can be prevented, and machining can be performed with high precision. Further, the pressurized working fluid in the fluid tank can be ejected from the gap between the tool electrode and the second die. As a result, in addition to the cooling in the fluid tank, the tool electrode can be cooled also above the fluid tank.

According to the sixth aspect of the present invention, in the electric discharge machining apparatus according to the first aspect, the compressed gas is air.

Here, for example, when the compressed gas is oxygen, the workpiece is burnt violently with the electric discharge machining. As a result, the processing can be advanced quickly, but the cost is increased. Also, for example, when the compressed gas is nitrogen, combustion is suppressed and the processing speed is reduced.

In this invention, the compressed gas is air. As a result, processing can be performed at a certain speed or more, and the cost required for compressed gas can be reduced.

According to the seventh aspect of the present invention, in the electric discharge machining apparatus according to the first aspect, the pressurized working fluid is water.

In this invention, the pressurized working fluid is water. As a result, the tool electrode can be cooled efficiently, and consumption of the tool electrode can be suppressed. Moreover, the cost required for the pressurized working fluid can be reduced.

According to the eighth aspect of the present invention, in the electric discharge machining apparatus according to the first aspect, the tool electrode is coaxially rotated during electric discharge machining.

In this invention, the tool electrode is coaxially rotated during electric discharge machining. As a result, it is possible to prevent deflection of the tool electrode generated during the electric discharge machining. Moreover, the mist ejected from mist generating space can be diffused more uniformly.

Advantageous Effects of Invention

According to the present invention, in the circumferential direction of the wall of the housing, the pressurized working fluid can be supplied into the mist generating region without deviation. As a result, the mist can be uniformly generated in the mist generating region and can be ejected without deviation along the tool electrode, so that shavings in the vicinity of the tool electrode where the electric discharge machining is performed are reliably removed.

DESCRIPTION OF EMBODIMENTS

Hereinafter, the embodiments of the present invention will be described with reference to the drawings. Each feature shown in the embodiments below can be combined with each other. In addition, the invention is established independently to each feature.

Figure 1:
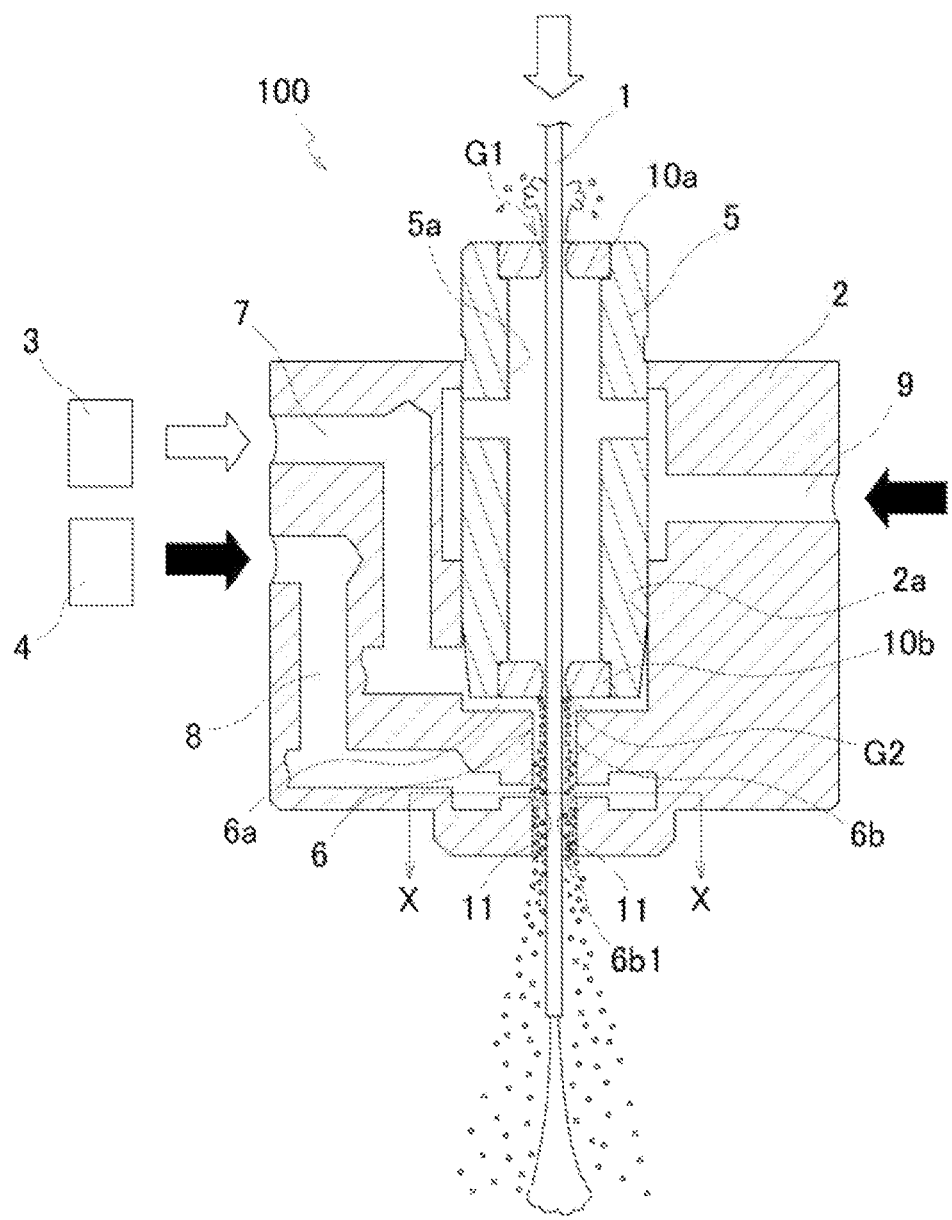
FIG. 1 is a view showing an outline of an electric discharge machining apparatus according to an embodiment of the present invention.

As shown in FIG. 1, the electric discharge machining apparatus 100 performs electric discharge machining with spraying mist to a machining portion of a workpiece (not shown). The electric discharge machining apparatus 100 includes a tool electrode 1, a housing 2, a compressed gas supplying device 3, and a pressurized working fluid supplying device 4 and the like. The tool electrode 1 generates discharge by applying voltage between the tool electrode 1 and the workpiece. The housing 2 holds the tool electrode 1. The compressed gas supplying device 3 supplies compressed gas for generating mist into the housing 2. The pressurized working fluid supplying device 4 supplies the pressurized working fluid for generating mist into the housing 2. Here, the white arrow of FIG. 1 is shown the compressed gas flowing from the compressed gas supplying device 3, and the black arrow of FIG. 1 is shown the pressurized working fluid flowing from the pressurized working fluid supplying device 4.

The tool electrode 1 is a cylindrical pipe electrode in which a hollow hole is provided. The outer diameter of the tool electrode 1 is, for example, 0.3 to 3.0 mm During electric discharge machining, the tool electrode 1 is coaxially rotated by a rotary drive (not shown). Further, compressed gas is supplied from the compressed gas supplying device 3 into the hollow hole of the tool electrode 1 and is ejected to the machining portion of the workpiece.

The housing 2 has a substantially cylindrical shape provided with the through hole 2a. A fluid tank 5 filled with the pressurized working fluid is attached to an upper portion of the through hole 2a from the approximately center thereof in a fitted state. A mist generating region 6 where the compressed gas and the pressurized working fluid are mixed to generate mist is provided in a lower part of the through hole 2a from the approximately center thereof. The tool electrode 1 is inserted through the through hole 2a so as to penetrate the fluid tank 5 and the mist generating region 6. The housing 2 is formed with a first flow path 7 through which compressed gas flows from the compressed gas supplying device 3 to the mist generating region 6. Also, the housing 2 is formed with a second flow path 8 through which the pressurized working fluid flows from the pressurized working fluid supplying device 4 to the mist generating region 6. Further, the housing 2 is formed with a third flow path 9 through which the pressurized working fluid flows from the pressurized working fluid supplying device 4 to the fluid tank 5.

The fluid tank 5 cools the tool electrode 1 by the pressurized working fluid flowing from the pressurized working fluid supplying device 4. The fluid tank 5 has a substantially cylindrical shape provided with the through hole 5a. The dies 10a and 10b are attached respectively to the upper and the lower end portion of the through hole 5a to seal the end portions for preventing from leaking of a large amount of pressurized working fluid filled therein, and to surround the outer periphery for supporting the tool electrode 1. Gaps G1, G2 are provided between the dies 10a,10b and the tool electrode 1, respectively. The size of the gaps G1 and G2 is, for example, 0.0025 to 0.010 mm.

The mist generating region 6 is formed just below the fluid tank 5 and includes a compressed gas supplying space 6a connecting with the first flow path 7 and a mist generating space 6b connecting with the second flow path 8.

The height of the compressed gas supplying space 6a is set low so that the cross-sectional area of the flow path of the compressed gas connecting to the mist generating space 6b becomes small. Thereby, the flow velocity of the compressed gas flowing from the first flow path 7 can be rapidly increased. The compressed gas supplying space 6a is formed to cover the entire upper side of the mist generating space 6b.

The mist generating space 6b is a cylindrical space connecting with the compressed gas supplying space 6a and continuous from the compressed gas supplying space 6a to the lower end of the housing 2. The inner diameter between the inner walls of the housing 2 in the mist generating space 6b is, for example, 0.8 to 5.0 mm. On the inner wall of the housing 2 which is a boundary between the mist generating space 6b and the second flow path 8, a plurality of pressurized working fluid supplying openings 11 are formed to eject pressurized working fluid flowing from the second flow path 8 into the mist generating space 6b.

Figure 2:
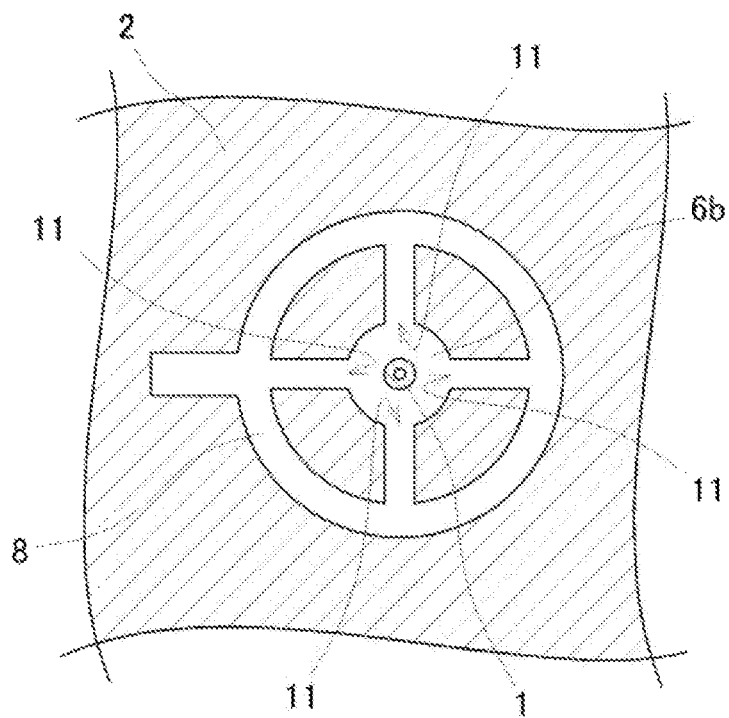
FIG. 2 is a cross-sectional view taken along line X-X in FIG. 1.

The plurality of pressurized working fluid supplying openings 11 are circular. The plurality of pressurized working fluid supplying openings 11 have the same size of diameter. The size of diameter of the pressurized working fluid supplying openings 11 is, for example, 0.2 to 0.5 mm. The plurality of pressurized working fluid supplying openings 11 are arranged at the same height. Two or more pressurized working fluid supplying openings 11 are arranged at equal angular interval in the circumferential direction of the inner wall of the housing 2 with the tool electrode 1 at the center, as viewed in the vertical direction, that is, the coaxial direction of the housing 2. In the present embodiment, as shown in FIG. 2, four pressurized working fluid supplying openings 11 are arranged at every 90 degrees in the circumferential direction of the inner wall of the housing 2 with the tool electrode 1 at the center, as viewed in the vertical direction. Further, in the present embodiment, the second flow path 8 surrounding the periphery of the mist generating space 6b branches into four and connects with the mist generating space 6b so that the four pressurized working fluid supplying openings 11 are formed.

The compressed gas supplying device 3 supplies compressed gas. The compressed gas is, for example, air. The pressurized working fluid supplying device 4 supplies pressurized working fluid. The pressurized working fluid is, for example, water.

Next, mist generation during electric discharge machining will be described in detail with reference to FIG. 1.

The compressed gas supplied into the compressed gas supplying space 6a is accelerated in the compressed gas supplying space 6a and flows into the mist generating space 6b, to form a high-speed compressed gas flow toward the mist ejecting opening 6b1. Further, as described above, the size of the gap G2 between the tool electrode 1 and the first die 10b is 0.0025 to 0.010 mm, and the diameter of the pressurized working fluid supplying opening 11 is 0.2 to 0.5 mm That is, the cross-sectional area of the supplying openings of the pressurized working fluid into the mist generating region 6 is small. Therefore, the pressurized working fluid is ejected from the gap G1 and the pressurized working fluid supplying opening 11 by the negative pressure generated in the mist generating region 6 due to the Venturi effect, in addition to the forcible pressurization by the pressurized working fluid. The ejected pressurized working fluid is finely atomized by the compressed gas and is ejected as mist from the mist ejecting opening 6b1.

(Action and Effect)

In the present embodiment, four pressurized working fluid supplying openings 11 are circular with the same diameter and are arranged at the same height. Furthermore, as shown in FIG. 2, four pressurized working fluid supplying openings 11 are arranged at every 90 degrees in the circumferential direction of the inner wall of the housing 2 with the tool electrode 1 at the center, as viewed in the vertical direction. As a result, pressurized working fluid can be supplied into the mist generating space 6b uniformly. Thus, since the mist can be uniformly generated in the mist generating space 6b and can be ejected without deviation along the tool electrode 1, shavings in the vicinity of the tool electrode 1 where the electric discharge machining is performed are reliably removed.

Further, as shown in FIG. 1, the pressurized working fluid supplying opening 11 is provided at the central portion in the vertical direction of the mist generating space 6b. Accordingly, the pressurized working fluid can be supplied into the compressed gas in which a stable flow is formed downward from the compressed gas supplying space 6a. As a result, the generated mist can be put in the gas flow and can be stably ejected.

Moreover, the tool electrode 1 is inserted through the fluid tank 5 with which pressurized working fluid is filled. Therefore, the tool electrode 1 can be cooled by the pressurized working fluid in the fluid tank 5. As a result, the temperature increase of the tool electrode 1 during electric discharge machining can be suppressed, and consumption of the tool electrode 1 can be suppressed.

Further, the compressed gas supplying space 6a is provided so as to cover the entire upper side of the mist generating space 6b. Therefore, compressed gas can flow to the mist generating space 6b through the compressed gas supplying space 6a. As a result, since the compressed gas can be supplied to the mist generating space 6b without deviation, the flow of the compressed gas can be further stabilized.

Further, dies 10a and 10b for supporting the tool electrode 1 are disposed at the upper end and the lower end of the through hole 5a of the fluid tank 5 to surround the outer periphery. Therefore, the dies 10a and 10b can prevent deflection of the tool electrode 1 generated during the electric discharge machining. As a result, the shift of a machining position can be prevented, and machining can be performed with high precision.

Further, a gap G2 is provided between the first die 10b and the tool electrode 1, and the size of the gap G2 is 0.0025 to 0.010 mm Therefore, the pressurized working fluid in the fluid tank 5 can be ejected from the gap G2 between the tool electrode 1 and the first die 10b by the Venturi effect. As a result, the pressurized working fluid in the fluid tank 5 can be used for mist generation. Moreover, the tool electrode 1 under the fluid tank 5 can be cooled by the pressurized working fluid.

Further, a gap G1 is provided between the second die 10a and the tool electrode 1, and the size of the gap G1 is 0.0025 to 0.010 mm Therefore, the pressurized working fluid in the fluid tank 5 can be ejected from the gap G1 between the tool electrode 1 and the second die 10a. As a result, in addition to the cooling in the fluid tank 5, the tool electrode 1 can be cooled also above the fluid tank 5.

Further, the compressed gas supplied from the compressed gas supplying device 3 is air. As a result, machining can be performed at a certain speed or more, and the cost required for compressed gas can be reduced.

Further, the pressurized working fluid supplied from the pressurized working fluid supplying device 4 is water. As a result, cooling of the tool electrode 1 can be performed efficiently and consumption of the tool electrode 1 can be suppressed. Moreover, the cost required for pressurized working fluid can be reduced.

Further, during the electric discharge machining, the tool electrode 1 is coaxially rotated by the rotary drive. As a result, it is possible to prevent deflection of the tool electrode 1 generated during electric discharge machining. Moreover, the mist ejected from the mist generating space 6b can be diffused more uniformly.

The preferred embodiments and examples of the present invention are described above, and the present invention is not limited to that. That is, various design changes can be made as long as they are described in the claims.

For example, in the present embodiment above, the tool electrode 1 is described as a pipe electrode, but the tool electrode 1 may be a rod-like electrode. Also, the through hole provided in the pipe electrode may be any number and shape.

In the present embodiment, the fluid tank 5 is described as being separately provided to the housing 2. Instead, the fluid tank 5 may be provided as an internal space in the housing 2, for example.

In the present embodiment, the mist generating space 6b is described as a cylindrical space penetrating from the compressed gas supplying space 6a to the lower end of the housing 2. Instead, the mist generating space 6b may have, for example, a trapezoidal cross section. More specifically, the distance between the inner walls of the housing 2 in the mist generating space 6b may be formed to increase as it approaches to the lower end of the housing 2. Also, the distance between the inner walls of the housing 2 in the mist generating space 6b may be formed to decrease as it approaches the lower end of the housing 2. Further, the mist generating space 6b may be formed with a portion where the distance between the inner walls of the housing 2 is large or small at an intermediate position in the vertical direction.

Further, in the above description, four pressurized working fluid supplying openings 11 are arranged at every 90 degrees in the circumferential direction of the inner wall of the housing 2 with the tool electrode 1 at the center, as viewed in the vertical direction. Instead, for example, the pressurized working fluid supplying opening 11 may be formed on the entire circumference of the inner wall of the housing 2.

Also, although the compressed gas is described as air, the compressed gas may be, for example, oxygen, nitrogen, or argon.

Also, although the pressurized working fluid is described as water, the pressurized working fluid may be, for example, a water-soluble working fluid or an oil-based working fluid.

The invention claimed is:
1. An electric discharge machining apparatus, comprising:
 a tool electrode that performs electric discharge machining to a workpiece;
 a housing in which the tool electrode is inserted;
 a compressed gas supplying device for supplying compressed gas into a mist generating region which is provided between an inner wall of the housing and the tool electrode;
 a first flow path through which the compressed gas flows and connecting the compressed gas supplying device with the mist generating region;
 a pressurized working fluid supplying device for supplying pressurized working fluid into the mist generating region;
 a second flow path through which the pressurized working fluid flows and connecting the pressurized working fluid supplying device with the mist generating region;
 a fluid tank through which the tool electrode is inserted, the fluid tank being disposed above the mist generating region; and
 a third flow path through which the pressurized working fluid flows from the pressurized working fluid supplying device into the fluid tank, the third flow path connecting the fluid tank with the pressurized working fluid supplying device,
 wherein a pressurized working fluid supplying opening, which is a boundary between the second flow path and the mist generating region, is disposed at two or more positions with equal angular interval in a circumferen- tial direction of the inner wall of the housing, or formed on an entire circumference of the inner wall of the housing, and the pressurized working fluid supplied into the mist generating region is mixed with the compressed gas in the mist generating region so that the pressurized working fluid is atomized to be ejected as mist.

2. The apparatus of claim 1, wherein the mist generating region includes a mist generating space provided on a lower side of the housing, and a compressed gas supplying space provided between the mist generating space and the fluid tank so as to cover an entire upper side of the mist generating space, the pressurized working fluid is supplied into the mist generating space from the pressurized working fluid supplying device through the second flow path, and the compressed gas is supplied into the compressed gas supplying space from the compressed gas supplying device through the first flow path.

3. The apparatus of claim 1, further comprising:

a plurality of dies supporting the tool electrode, wherein a first die of the dies is disposed at a lower end of the fluid tank, and a gap is provided between the tool electrode and the first die.

4. The apparatus of claim 3, further comprising:

a plurality of dies supporting the tool electrode, wherein a second die of the dies is disposed at an upper end of the fluid tank, and a gap is provided between the tool electrode and the second die.

5. The apparatus of claim 1, wherein the compressed gas is air.

6. The apparatus of claim 1, wherein the pressurized working fluid is water.

7. The apparatus of claim 1, wherein the tool electrode is configured to be coaxially rotatable.

\* \* \* \* \*